US007092015B1

(12) United States Patent
Sogawa (10) Patent No.: US 7,092,015 B1
(45) Date of Patent: Aug. 15, 2006

(54) APPARATUS AND METHOD FOR STEREO MATCHING AND METHOD OF CALCULATING AN INFINITE DISTANCE CORRESPONDING POINT (75) Inventor: Yoshiyuki Sogawa, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 587 days.

(21) Appl. No.: 09/665,952

(22) Filed: Sep. 21, 2000

(30) Foreign Application Priority Data

Sep. 22, 1999 (JP) .............................. P. 11-269182

(51) Int. Cl.
H04N 5/235 (2006.01)
H04N 5/228 (2006.01)

(52) U.S. Cl. ..................................... 348/222.1; 348/42

(58) Field of Classification Search ............. 348/222.1, 348/373, 116, 333.06, 118, 148, 221.1, 42; 358/88, 229, 3, 209; 352/57; 382/106, 154; 356/3, 3.14, 12; 396/128
See application file for complete search history.

(56) References Cited

U.S. PATENT DOCUMENTS

| 5,410,346 | A | * | 4/1995 | Saneyoshi et al. .......... 348/116 |
| 5,530,420 | A | * | 6/1996 | Tsuchiya et al. ............ 348/116 |
| 5,535,144 | A | * | 7/1996 | Kise ............................ 348/116 |
| 5,719,954 | A | * | 2/1998 | Onda .......................... 356/611 |
| 5,915,033 | A | * | 6/1999 | Tanigawa et al. ........... 348/349 |
| 5,929,784 | A | * | 7/1999 | Kawaziri et al. ............ 356/14 |
| 6,373,518 | B1 | * | 4/2002 | Sogawa ....................... 348/43 |
| 6,381,360 | B1 | * | 4/2002 | Sogawa ...................... 382/154 |

FOREIGN PATENT DOCUMENTS

| DE | 198 50 846 A1 | 5/1999 |
| JP | 5-114099 | 5/1993 |
| JP | 6-273171 | 9/1994 |
| JP | 11-325889 | 11/1999 |
| JP | 2000-207555 | 7/2000 |

OTHER PUBLICATIONS

European Search Report, dated Nov. 19, 2002, for European Patent Application EP 00 30 787.2, pp. 1-6.

* cited by examiner

Primary Examiner—David Ometz
Assistant Examiner—Gevell Selby
(74) Attorney, Agent, or Firm—Smith, Gambrell & Russell, LLP (57) ABSTRACT The reference image data corresponding to one pixel block stored in a reference image line memory 6 is output to a stereo matching circuit 8. The comparative image data corresponding to a "search range" stored in a comparative image line memory 7 is output to the stereo matching circuit 8 according to an instruction of a search range address generator 13. The stereo matching circuit 8 calculates parallaxes by performing the stereo matching based on the reference image data and the comparative image data. A position where the search range S is set is corrected based on the amount of the deviation of an infinite distance corresponding point with respect to a position of the reference image data.

23 Claims, 5 Drawing Sheets

APPARATUS AND METHOD FOR STEREO MATCHING AND METHOD OF CALCULATING AN INFINITE DISTANCE CORRESPONDING POINT

BACKGROUND OF THE INVENTION

1. Field of the Invention

The present invention relates to an apparatus and a method for stereo matching and a method of calculating an infinite distance corresponding point. More particularly, the present invention relates to setting of a search range to be used in stereo matching.

2. Description of the Related Art

A stereo processing apparatus is known in the prior art, which obtains a pair of photographed images with a stereo camera system and calculates a distance to an object (or a parallax) shown in the photographed images based on the pair of photographed images obtained from a stereo camera system. First, the processing apparatus identifies a correlated destination of a given pixel block of one photographed image (right image, for example) in the other photographed image (left image, for example) (stereo matching). Then, the processing apparatus calculates a parallax of the pixel block, that is, the amount of deviation in a horizontal direction between the position of the pixel block (a correlated source) on the right image and the position of the correlated destination on the left image.

As is commonly known, the correlated destination of a given pixel block in the right image (reference image) exists on an epipolar line in the left image (comparative image), or on the same horizontal line (at the same vertical coordinate) as the correlated source of the reference image is located, according to the principle of a stereo method. Accordingly, the parallax is calculated as the amount of rightward deviation with respect to a horizontal coordinate of the correlated source on the reference image. Here, assuming that the distance from the stereo camera system to an object is infinitely large, its theoretical parallax is zero and the correlated destination exists at the same horizontal coordinate as the correlated source. A point of the horizontal coordinate on the epipolar line of the correlated destination calculated when the object is located at an infinite distance is referred to as an "infinite distance corresponding point." The amount of the rightward deviation (parallax) with respect to this infinite distance corresponding point increases as the distance to the object decreases. Therefore, a search range to be used when performing stereo matching may be set to be a predetermined range located to the right with respect to a point where the correlated destination is located most leftward, or the infinite distance corresponding point.

A coordinate point of the correlated source on the reference image (hereinafter referred to as a "reference coordinate point") and the infinite distance corresponding point on the comparative image theoretically coincide with each other as seen above. In actuality, however, there are many cases in which they deviate from each other. The degree of such deviation is not uniform over the whole image but varies depending on the location in the image. A potential cause of this deviation is that focal distances of the right and left cameras differ from each other, causing one of the images to be enlarged or reduced compared to the other. The deviation can also occur due to distortion of camera lenses or an error in camera mounting position, for instance. As a consequence, there can arise such a situation that the infinite distance corresponding point is located to the left (which is opposite to the normal direction) of the reference coordinate point. Thus, there arises a problem that, if the reference coordinate point is set to as starting point of a search range, it becomes impossible to identify a correlated destination located to the left of this starting point.

A potential solution to this problem would be to set the starting point of the search range to the left of the reference coordinate point with some margin. The amount of deviation of the infinite distance corresponding point from the reference coordinate point, however, is not uniform for different image areas as stated above. Therefore, when setting a margin of a fixed amount, it needs to be set to a larger amount than the amount of a maximum deviation of the infinite distance corresponding point. As a consequence, however, the search range widens as much as the increased amount of the margin thus provided, and this causes a problem that computational complexity involved in stereo matching increases, resulting in a reduction in processing speed. In addition, the possibility of mismatching increases as much as the increase in the search range. Consequently, there also arises a problem that the reliability of calculated parallaxes, or calculated distances, deteriorates.

SUMMARY OF THE INVENTION

The present invention has been made in view of the aforementioned problems. Accordingly, a first object of the present invention is to provide an apparatus and a method for stereo matching which can variably set a search range when performing stereo matching depending on the location on an image, and a method of calculating an infinite distance corresponding point.

A second object of the present invention is to avoid an expansion of a search range by setting an appropriate search range depending on the location on an image, and thereby avoid an increase in computational complexity required for the stereo matching operation.

A third object of the present invention is to reduce the possibility of mismatching by avoiding an expansion of the search range, and thereby prevent deterioration of the reliability of distance data.

The objects can be achieved by a stereo matching apparatus which comprises a stereo camera system, a memory, an address generator, and a stereo matching unit. The stereo camera system takes pictures of a predetermined area and producing first and second images of the predetermined area. The memory stores first image data within a reference pixel region in the first image and second image data on a horizontal line in the second image, the horizontal line being corresponding to a vertical position of the reference pixel region in the first image. The address generator sets a search range for a stereo matching and instructs to read out form the memory a part of the second image data which is within the search range and the first image data within the reference pixel region. The stereo matching unit identifies a correlated destination of the reference pixel region by the stereo matching based on the part of the second image data which is within the search range and the first image data within the reference pixel region which are read out from the memory and calculates a parallax of the reference pixel region based on the correlated destination of the reference pixel region. The above-mentioned address generator corrects a location of the search range for the reference pixel region based on the amount of deviation of an infinite distance corresponding point with respect to a horizontal position of the reference pixel region.

In the stereo matching apparatus of the invention, it is preferable that the address generator shifts the location of the search range in the same direction as a direction of the deviation of the infinite distance corresponding point with respect to the horizontal position of the reference pixel region. The address generator may shift a starting point of the search range in the same direction as the direction of the deviation of the infinite distance corresponding point. Further, the address generator may shift an end point of the search range in the same direction as the direction of the deviation of the infinite distance corresponding point.

Further, in the stereo matching apparatus of the invention, it is preferable that the address generator identifies the amount of correction of the search range in relation to the amount of deviation of the infinite distance corresponding point.

Furthermore, it is also preferable that the stereo matching apparatus further comprises a correction value memory. The correction value memory stores a correction value for correcting the location of the search range in relation to a location of the reference pixel region in the first image. In this case, the address generator sets the location of the search range for the reference pixel region based on the location of the reference pixel region and the correction value stored in the correction value memory for the location of the reference pixel region. The address generator may set the starting point of the search range for the reference pixel region based on the location of the reference pixel region and the correction value stored in the correction value memory for the location of the reference pixel region.

In the above-mentioned stereo matching apparatus, the stereo camera system may comprise a pair of stereo cameras mounted on a vehicle, the pair of stereo cameras taking pictures of scenes outside of the vehicle. In this case, the stereo matching unit calculates a distance to an object outside the vehicle on the basis of the parallax of the reference pixel region.

The above-mentioned objects can be also achieved by a stereo matching method comprising: taking pictures of a predetermined area and producing first and second images of the predetermined area; identifying a reference pixel region in the first image; identifying a search range for the reference pixel region in the second image; correcting a location of the search range for the reference pixel region based on the amount of deviation of an infinite distance corresponding point with respect to a horizontal position of the reference pixel region; and identifying a correlated destination of the reference pixel region by searching through the search range.

In the stereo matching method of the invention, it is preferably advantageous that the step of correcting the location of the search range shifts the location of the search range in the same direction as the direction of the deviation of the infinite distance corresponding point with respect to the horizontal position of the reference pixel region. The step of correcting the location of the search range may shift a starting point of the search range in the same direction as the direction of the deviation of the infinite distance corresponding point with respect to the horizontal position of the reference pixel region. Further, the step of correcting the location of the search range may shift an end point of the search range in the same direction as the direction of the deviation of the infinite distance corresponding point with respect to the horizontal position of the reference pixel region.

In the above-mentioned stereo matching method of invention, it is further advantageous that the step of correcting the location of the search range corrects the location of the search range with a correction value corresponding to the deviation of the infinite distance corresponding point.

Further, it is advantageous that the stereo matching method further comprises: calculating a distance to an object outside a vehicle on the basis of the correlated destination of the reference pixel region. In this case, the step of taking pictures of the predetermined area takes pictures of scenes outside of the vehicle.

Furthermore, it is advantageous that the stereo matching method further comprises: taking picture of a screen by a pair of stereo cameras and producing third and fourth images of the screen, the screen being drawn a first vertical line and a second vertical line at an interval equal to a baseline of the stereo cameras; identifying a deviation of a position of the second vertical line shown on the fourth image with respect to a position of the first vertical line shown on the third image; and calculating an infinite distance corresponding point corresponding to each position on the first vertical line shown on the third image on the basis of the deviation of the position of the second vertical line. In this case, the step of correcting the location of the search range uses the infinite distance corresponding point thus calculated as the infinite distance corresponding point corresponding to the horizontal position of the reference pixel region.

Further, the above-mentioned objects can be achieved a stereo matching apparatus which comprises a stereo camera system, a reference pixel region identifying unit, a search range identifying unit, a correction unit and a correlated destination identifying unit. The stereo camera system takes pictures of a predetermined area and producing first and second images of the predetermined area. The reference pixel region identifying unit identifies a reference pixel region in the first image. The search range identifying unit identifies a search range for the reference pixel region in the second image. The correction unit corrects a location of the search range for the reference pixel region based on the amount of deviation of an infinite distance corresponding point with respect to a horizontal position of the reference pixel region. The correlated destination identifying unit identifies a correlated destination of the reference pixel region by searching through the search range.

Furthermore, the above-mentioned objects can be achieved by a method of calculating an infinite distance corresponding point. The method comprising: taking picture of a screen by a pair of stereo cameras and producing first and second images of the screen, the screen being drawn a first vertical line and a second vertical line at an interval equal to a baseline of the stereo cameras; identifying a deviation of a position of the second vertical line shown on the second image with respect to a position of the first vertical line shown on the first image; and calculating an infinite distance corresponding point corresponding to each position on the first vertical line shown on the first image on the basis of the deviation of the position of the second vertical line.

DETAILED DESCRIPTION OF THE PREFERRED EMBODIMENT

Figure 1:
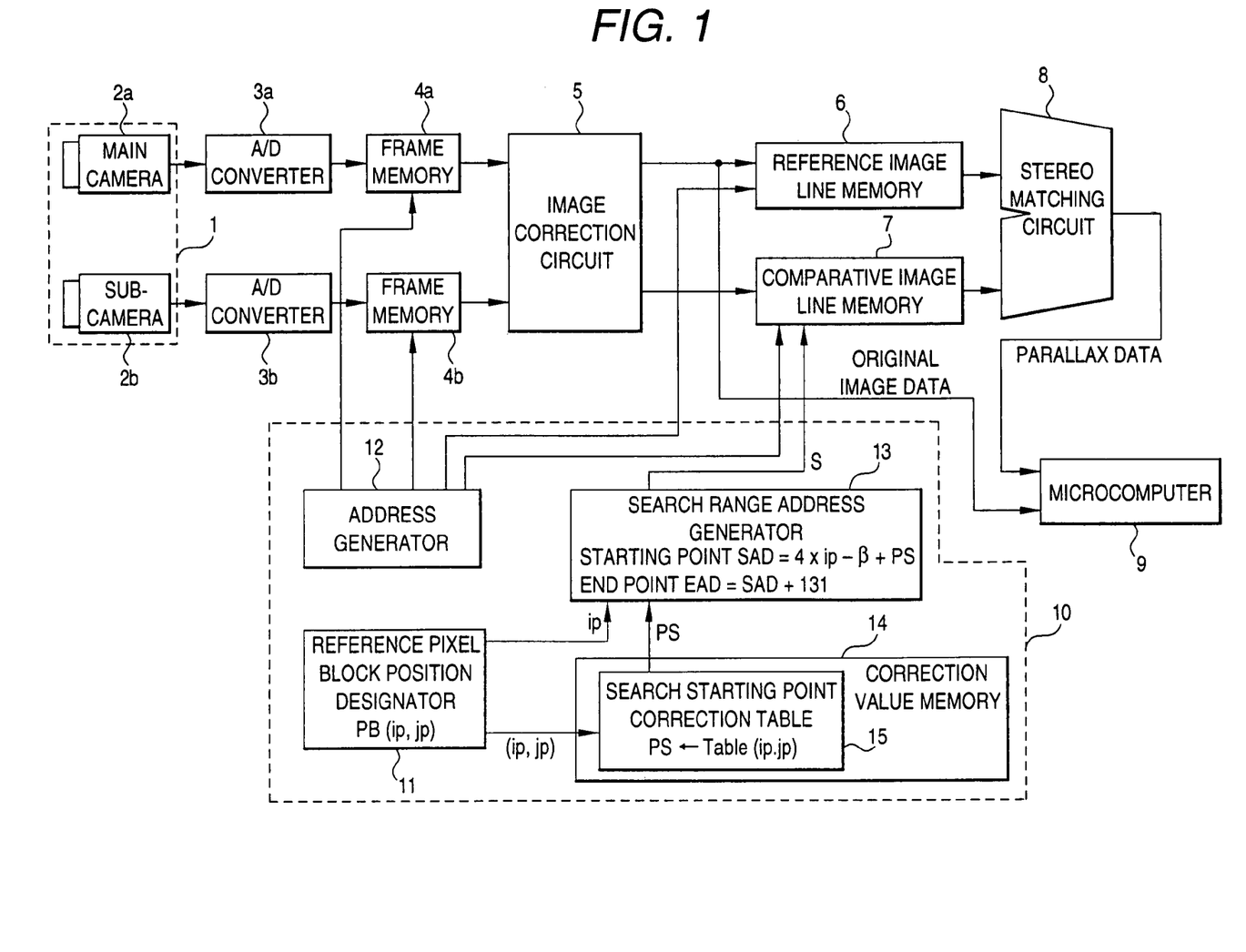
FIG. 1 is a block diagram of a stereo processing apparatus according to an embodiment of the present invention.

FIG. 1 is a block diagram of a stereo processing apparatus according to an embodiment of the present invention. A stereo camera system 1 which takes pictures of views outside a vehicle is mounted in the vicinity of its rear-view mirror. The stereo camera system 1 is composed of a pair of cameras 2a, 2b, each incorporating an image sensor such as a charge-coupled device (CCD) These cameras 2a, 2b are attached with a predetermined spacing in the direction of vehicle width therebetween. The main camera 2a for obtaining a reference image data is attached on the right side of the vehicle's forward direction. On the other hand, the sub-camera 2b for obtaining a comparative image is attached on the left side of the forward direction.

In a condition in which the pair of the cameras 2a, 2b is synchronized, analog images output from the cameras 2a, 2b are respectively converted by analog-to-digital (A/D) converters 3a, 3b into digital images, each digital image having a predetermined brightness level (e.g., 256 gray scale levels) As a consequence, reference image data (brightness data) of 512 pixels in the horizontal direction by 200 pixels in the vertical direction is produced from an output signal of the main camera 2a. Also, from an output signal of the sub-camera 2b, comparative image data is obtained, the comparative image having the same vertical length as the reference image and a greater horizontal length than the reference image (640 pixels in the horizontal direction by 200 pixels in the vertical direction, for example). The digitized stereoscopic images (reference image and comparative image) for one frame (one view) are individually stored in frame memories 4a, 4b having a capacity to store digital data for one frame.

The data stored in predetermined memory areas in the frame memories 4a, 4b are read out according to instructions from an address generator 12 which constitutes part of an address generating circuit 10. The image data thus read out are transferred to an image correction circuit 5. The image correction circuit 5 carries out such operations as a position correction and a brightness correction of the images so as to increase the accuracy of stereo matching which is performed by a stereo matching circuit 8 in a later stage. There are cases where the positions of the stereoscopic images are displaced due to a deviation of mounting positions (in a horizontal, vertical or rotational direction) of the right and left cameras 2a, 2b, a distortion of camera lenses, or an inclination of a light-sensing surface of each CCD, for instance. Accordingly, the deviation of the stereoscopic images is reduced by applying a linear shape correction like affine transformation or a nonlinear shape correction to the stereoscopic images. A nonlinear correction method that can be used, for example, is a method described in Japanese Patent Application No. Hei. 10-132275(Japanese Patent Unexamined Publication No. Hei. 11-325889). The brightness correction is a correction for correcting differences in the sensitivity of the stereo processing apparatus. The brightness correction, for example, is a LOG correction for improving the contrast of low-brightness parts (described in Japanese Patent Application No. Hei. 11-6879(Japanese Patent Unexamined Publication No. 2000-207555)), a shading correction for correcting brightness values based on a shading correction ratio stored for each pixel (described in Japanese Patent Application No. Hei. 5-58974(Japanese Patent Unexamined Publication No. Hei. 06-273171)), etc.

The reference image data corrected by the image correction circuit 5 is stored in a memory area in a reference image line memory 6. More specifically, the reference image data of four horizontal lines in pixel units (one horizontal line in pixel block units 4×4) is stored. Also, the comparative image data corrected by the image correction circuit 5 is stored in a memory area in a comparative image line memory 7. More specifically, the comparative image data of one horizontal line in pixel block units is stored. The expression "one horizontal line" used in the following explanation refers to one horizontal line in pixel block units. The address generator 12 specifies the memory areas of the line memories 6, 7 in which the image data are written. The reference image data output from the image correction circuit 5 is also entered to a microcomputer 9.

The reference image data corresponding to one pixel block(reference pixel block) stored in the reference image line memory 6 is readout according to an instruction from the address generator 12 and transferred to the stereo matching circuit 8. The data thus transferred is correlated source data to be used when performing stereo matching operation. In other words, it is pixel data of each pixel (brightness value) in the reference pixel block(hereafter, referred to as "reference pixel block data"). Also, the comparative image data corresponding to a "search range" stored in the comparative image line memory 7 (hereafter referred to as "search range data") is read out according to an instruction from a search range address generator 13 and transferred to the stereo matching circuit 8. The data thus transferred is pixel data of each pixel (brightness value) to be used in the stereo matching(hereafter, referred to as "search range data"). As the "search range" set by the search range address generator 13 is one of features of the present embodiment, it will be described later in detail.

The stereo matching circuit 8 calculates parallaxes by performing the stereo matching based on the reference pixel block data and the search range data. Since the parallax is calculated for each pixel block of 4×4 pixels, a maximum of 128×50 parallaxes can be obtained from one complete frame of the reference image. Considering one pixel block (reference pixel block) in the reference image, a region (correlated destination) having a correlation with brightness properties of the one pixel block is identified by searching through the search range in the comparative image. While shifting a search point pixel by pixel along the aforementioned epipolar line, the stereo matching circuit 8 evaluates the state of correlation of each pixel block within the search range with the reference pixel block.

The correlation between two pixel blocks can be evaluated by calculating city block distance CB shown in the following equation (1), for instance. In this equation, $p1_{ij}$ represents a brightness value of pixel (i, j) of one pixel block, while $p2_{ij}$ represents a brightness value of pixel (i, j) of the other pixel block. The city block distance CB is the sum (absolute value) of differences between the two geographically corresponding brightness values p1ij, p2ij for one complete pixel block, wherein the smaller the differences, the greater the correlation between the two pixel blocks.

$$CB=\Sigma|p1ij-p2ij| \quad (1)$$

Basically, a pixel block which gives a minimum value of city block distance CB among city block distances CB calculated for the each pixel block existing on the epipolar line is judged to be the correlated destination of the reference pixel block. The amount of deviation between the correlated destination thus identified and the reference pixel block is the parallax.

The stereo matching circuit 8 also evaluates the presence or absence of a brightness edge (the amount of brightness change) in the horizontal direction of the pixel block, as well as its relationship with maximum and minimum values of the city block distance CB calculated on the same epipolar line. Furthermore, to ensure reliability as distance data, the stereo matching circuit 8 performs a filtering operation on the parallax and outputs only such parallax that has been judged to be valid (the parallax which has been judged to be valid is hereinafter referred to simply as the "parallax"). Reference should be made to Japanese Patent Unexamined Publication No. 5-114099 for details of hardware configuration and filtering operation for calculating the city block distance, if necessary, since they are disclosed therein. The parallax calculated through the aforementioned operation is transferred to the microcomputer 9.

In this embodiment, the address generating circuit 10 has a function of setting a search range S to be used when performing the stereo matching. To realize this function, the address generating circuit 10 has a reference pixel block position designator 11, a correction value memory 14 and the search range address generator 13. The position where the search range S is set is corrected as follows according to the status of an infinite distance corresponding point $\chi$ of the position (ip, jp) of a reference pixel block PB.

First, for the reference pixel block PB to be subjected to the stereo matching, the reference pixel block position designator 11 identifies its position (ip, jp) on the reference image (where $0 \leq ip \leq 127$, $0 \leq jp \leq 49$) in pixel block units. Then, the position (ip, jp) of the reference pixel block PB is output to the search range address generator 13 and the correction value memory 14.

When the position (ip, jp) of the reference pixel block PB has been identified by the reference pixel block position designator 11, reference is made to a search starting point correction table 15 stored in the correction value memory 14, and then a correction value PS for the reference pixel block PB is identified. The correction value memory 14 is formed of an electrically erasable programmable read-only memory (EEPROM), for example. This correction value PS is a value for correcting a starting point of the search range S in the comparative image, or for correcting the search starting point, applicable when searching for a correlated destination of the reference pixel block PB. Correction values PS are set and written in the correction value memory 14, based on deviation characteristics of an infinite distance corresponding point $\chi$ on a photographed image measured at the time of a system initialization (i.e., in an adjustment process in a factory or during readjustment at a dealer). The infinite distance corresponding point $\chi$ and the correction value PS generally have the following relationship:

(Relationship Between Infinite Distance Corresponding Point $\chi$ and Correction Value PS)

1. The correction value PS is of the same sign as the direction (plus or minus) of deviation of the infinite distance corresponding point $\chi$ with respect to a reference coordinate point X (the coordinate point of the reference pixel block PB)

2. The greater the amount of deviation of the infinite distance corresponding point $\chi$ with respect to the reference coordinate point X, the greater the amount of correction that the correction value PS indicates.

When the correction value PS corresponding to the position (ip, jp) of the reference pixel block has been read out from the correction value memory 14, a starting point SAD of a search range S and an end point EAD thereof are calculated based on the following equations by the search range address generator 13 and the search range S is set:

(Setting of Search Range S)
Starting point SAD $(4 \times ip - \beta) + PS$
End point EAD=SAD+131

Specifically, the reference coordinate point X (in pixel units) is calculated by multiplying the horizontal coordinate ip of the reference pixel block PB by the number of horizontally arranged pixels 4 in one pixel block. A basic starting point A is calculated by subtracting a specified margin $\beta$ from the reference coordinate point X (or by shifting the reference coordinate point X leftward). The starting point SAD of the search range S is a value obtained by adding the correction value PS to the basic starting point A. Also, the end point EAD of the search range S is a value obtained by adding a specified value 131 to the starting point SAD, so that this value is uniquely determined when the starting point SAD is determined. The search range S is therefore the range (as wide as 132 pixels) from the starting point SAD to the end point EAD.

The search range address generator 13 gives an instruction to the comparative image line memory 7 that the comparative image data (search range data) within the search range S thus set should be read out. The search range data read out is transferred to the stereo matching circuit 8. The stereo matching circuit 8 then calculates the aforementioned city block distance CB based on the reference pixel block data transferred from the reference image line memory 6 and the search range data.

Figure 2:
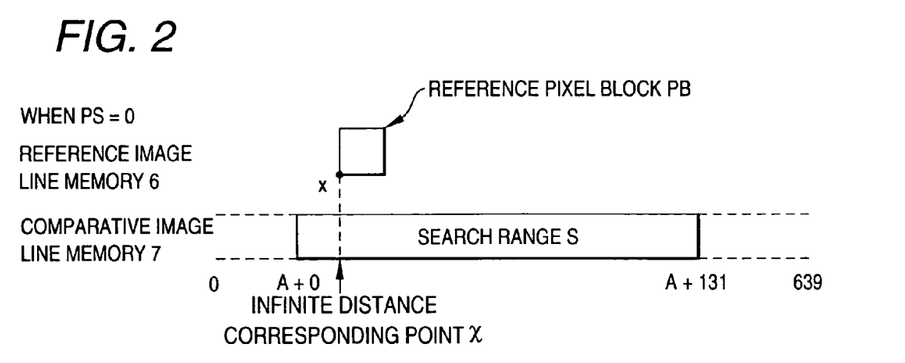
FIG. 2 is a diagram showing a search range when a correction value is set to 0.

FIG. 2 is a diagram showing a search range S set when a correction value PS is 0. The correction value PS is set according to its relationship with the measured infinite distance corresponding point $\chi$ as described above. Thus, the correction value PS of 0 means that the deviation of the infinite distance corresponding point $\chi$ with respect to the reference coordinate point X is 0 or, in other words, the infinite distance corresponding point $\chi$ exists at the same horizontal coordinate as the reference coordinate point X. Therefore, even when search operation is begun from the basic starting point A (correction value PS=0), the infinite distance corresponding point $\chi$ will in no case depart from the search range S. The end point EAD of the search range S in this case is A+131.

Figure 3:
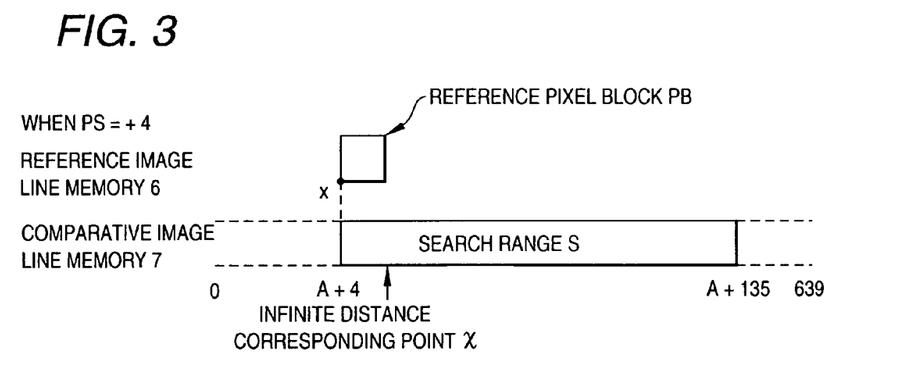
FIG. 3 is a diagram showing a search range when a correction value is set to +4.

FIG. 3 is a diagram showing a search range S set when a correction value PS is +4. Since the correction value PS is +4, the starting point SAD is set to a value obtained by adding the correction value 4 to the basic starting point A and the end point EAD is set to +135. The correction amount PS of +4 indicates that the infinite distance corresponding point $\chi$ deviates rightward by the amount of correction equal to 4 with respect to the reference coordinate point X. Therefore, even when the starting point SAD is shifted rightward by the amount of correction, the infinite distance corresponding point $\chi$ will in no case depart from the search range S, and it is assured that the infinite distance corresponding point χ exists in the right-hand vicinity of the starting point SAD.

Figure 4:
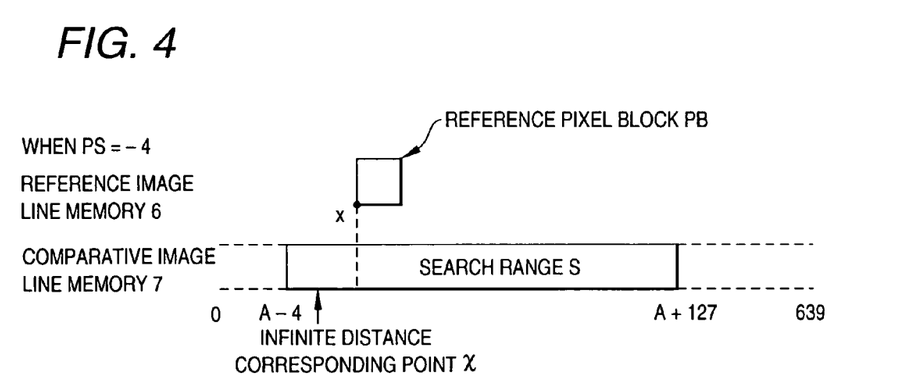
FIG. 4 is a diagram showing a search range when a correction value is set to −4.

FIG. 4 is a diagram showing a search range S set when a correction value PS is −4. Since the correction value PS is −4, the starting point SAD is set to a value obtained by subtracting the correction value 4 from the basic starting point A and the end point EAD is set to +127. The correction amount PS of −4 indicates that the infinite distance corresponding point χ deviates leftward by the amount of correction equal to 4 with respect to the reference coordinate point X. Therefore, it is possible to prevent the infinite distance corresponding point χ from departing from the search range S by shifting the starting point SAD leftward as much as the amount of correction. It is assured that the infinite distance corresponding point χ exists in the right-hand vicinity of the starting point SAD in this case as well.

Considering that the deviation of the infinite distance corresponding point χ with respect to the reference coordinate point X is not uniform for different image areas, the starting point SAD and the end point EAD of the search range S are shifted in this embodiment. In contrast, if the search range S is set at a fixed location, it is necessary to shift the starting point of the search range S leftward by a margin determined in consideration of the amount of a maximum deviation of the infinite distance corresponding point χ and also shift its end point rightward by a relatively large margin. If the location of the search range is made variable according to the deviation of the infinite distance corresponding point as in the present embodiment, it is not necessary to set such large margins so that an expansion of the search range will not result. As a consequence, it is possible to avoid an increase in computational complexity required for the stereo matching and to prevent a reduction in processing speed. It is also possible to reduce the possibility of mismatching in the stereo matching, because it is not necessary to set a large search range. It is therefore possible to ensure the accuracy of calculated parallaxes, or calculated distances.

Figure 5:
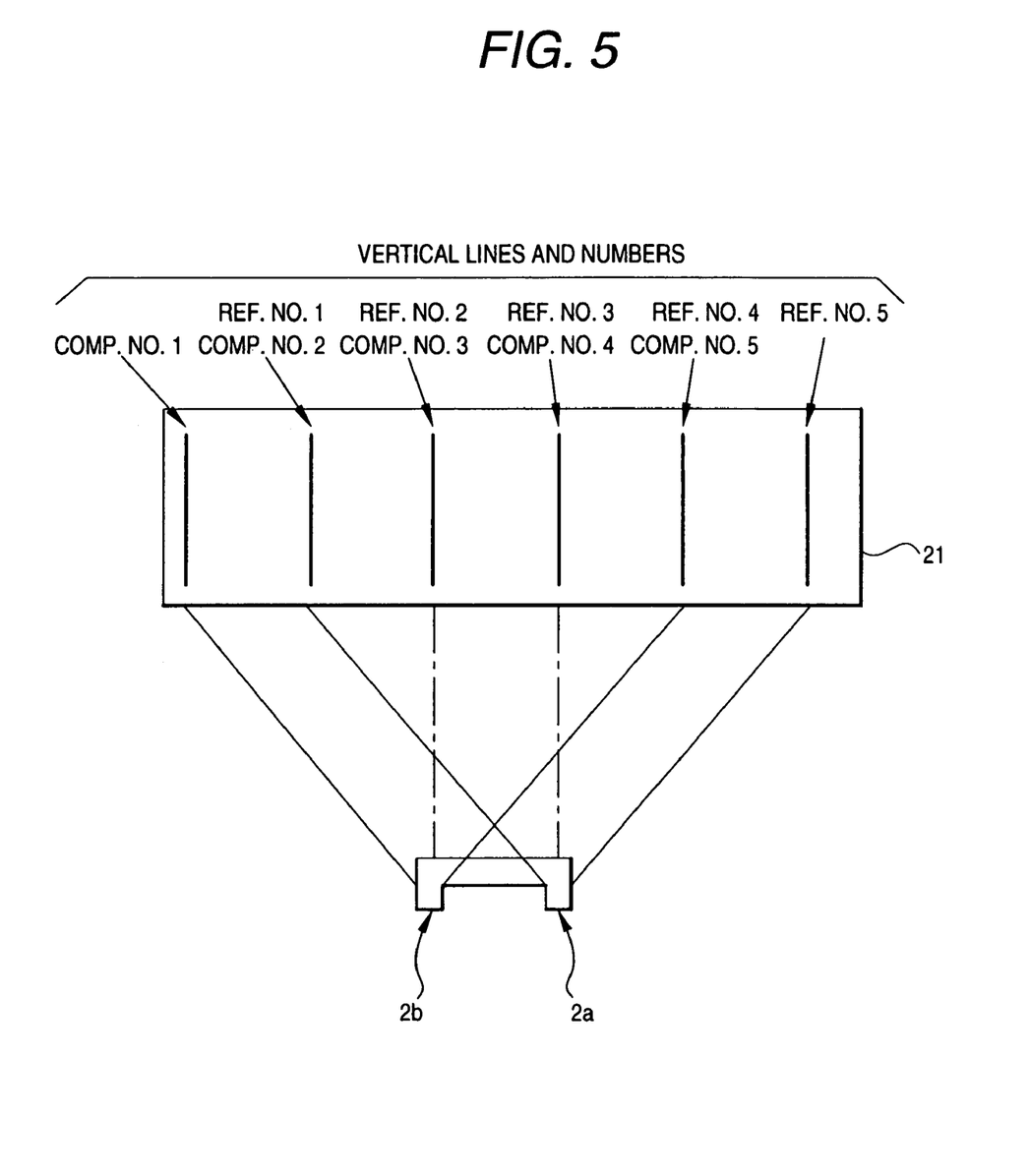
FIG. 5 is a diagram for explaining a method of calculating an infinite distance corresponding point according to the present invention.

In the above-mentioned embodiments, the starting point SAD of the search range S is obtained by adding the correction value PS to the basic starting point A, and the end point EAD thereof is obtained by adding the specified value 131 to the starting point SAD. However, the ending point EAD of the search range S may be obtained by adding the correction value PS. In this case, the starting point SAD is obtained by subtracting the specified value 131 to the ending point EAD. The deviation of the infinite distance corresponding point χ with respect to the reference coordinate point X can be obtained by the following method. FIG. 5 is a diagram for explaining a method of calculating the infinite distance corresponding point χ according to the present invention. First, to identify the infinite distance corresponding point χ, a special screen 21 is placed at a predetermined position in front of the stereo camera system 1. Six vertical lines are drawn on this screen 21, wherein an interval between the adjacent vertical lines is made equal to a length of the baseline of the stereo camera system 1, or to an interval between the right camera 2a and the left camera 2b. The individual vertical lines are numbered to permit their identification. Specifically, the rightmost vertical line on the screen is numbered "comparison No. 1," from where the rest of the vertical lines are sequentially numbered "comparison No. 2" to "comparison No. 5." Also, the second vertical line from the right side of the screen is numbered "reference No. 1," from where the rest of the vertical lines are sequentially numbered "reference No. 2" to "reference No. 5." The screen 21 is positioned in such a way that the vertical line "reference No. 3" would be shown at the center of a photographed image (reference image) when the screen 21 is photographed by the right camera 2a. As a result, the vertical line "comparison No. 3" is shown at the center of a photographed image (comparative image) taken by the left camera 2b.

Figure 6:
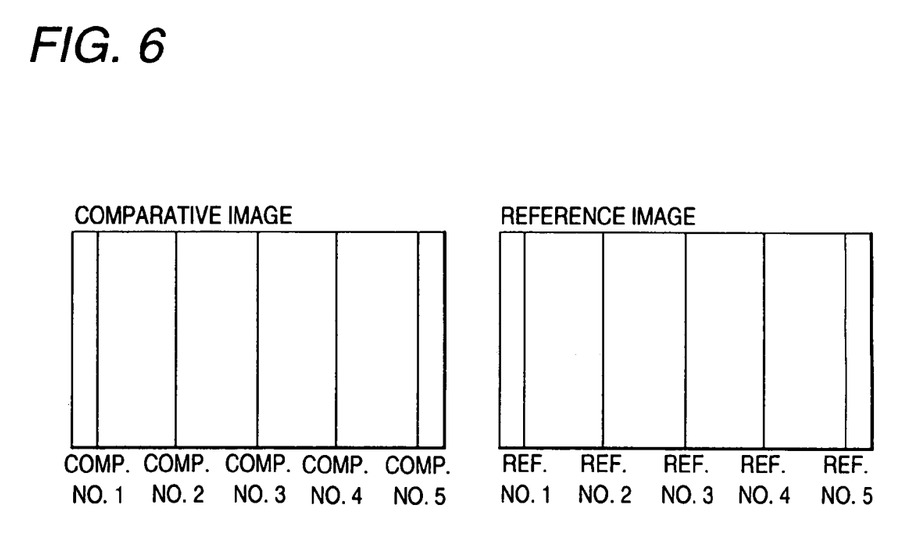
FIG. 6 is a diagram showing ideal photographed images.

When such screen 21 is photographed with the stereo camera system 1, photographed images as shown in FIG. 6 are obtained under an ideal condition. Under this condition, the positions of the vertical lines "comparison No. 1" to "comparison No. 5" shown on the comparative image perfectly coincide with the positions of the corresponding vertical lines "reference No. 1" to "reference No. 5" shown on the reference image. The interval between the individual vertical lines is made equal to the length of the baseline of the stereo camera system 1. Therefore, according to characteristics of the stereo method, the corresponding vertical lines "comparison No. 1" to "comparison No. 5" on the comparative image correspond to infinite distance corresponding points χ at the respective positions (their deviation is 0 in this case).

Figure 7:
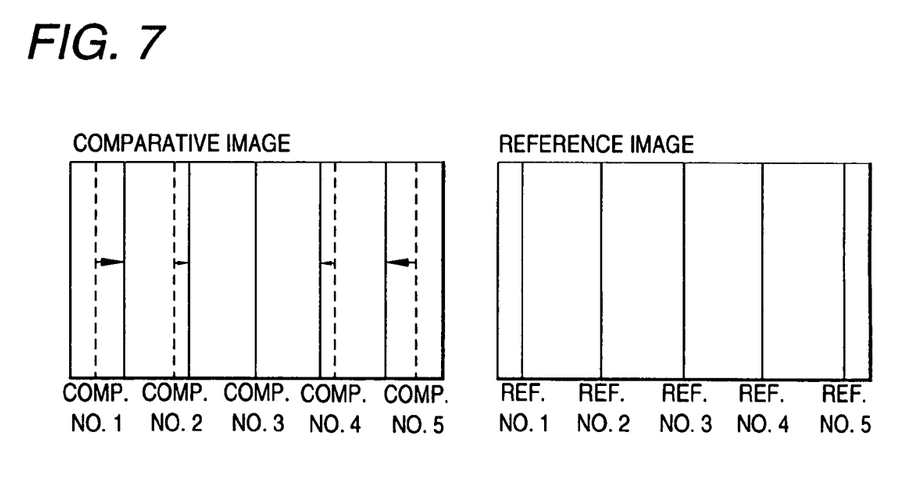
FIG. 7 is a diagram showing photographed images obtained in a case where a focal distance of a left camera is smaller than a focal distance of a right camera.

If there is any influence of variations in focal distances or lens distortion of the right and left cameras 2a, 2b, or an error in horizontal positions of right and left cameras 2a, 2b, the photographed images as shown in FIG. 6 would not be obtained. FIG. 7 is a diagram showing photographed images obtained in a case where the focal distance of the left camera 2b is smaller than the focal distance of the right camera 2a (where the left camera 2b is more wide-angled). In this case, the comparative image shown will be reduced in the horizontal direction, centering on the center of the image. Therefore, the vertical lines "comparison No. 1" and "comparison No. 2" are shifted rightward compared to those under the ideal condition, while the vertical lines "comparison No. 4" and "comparison No. 5" are shifted leftward compared to those under the ideal condition. For this reason, an object (which has a finite distance) shown on the individual vertical lines "reference No. 1" to "reference No. 5" is always located to the right of the positions of their corresponding vertical lines "comparison No. 1" to "comparison No. 5" (i.e., the infinite distance corresponding points x)

Figure 8:
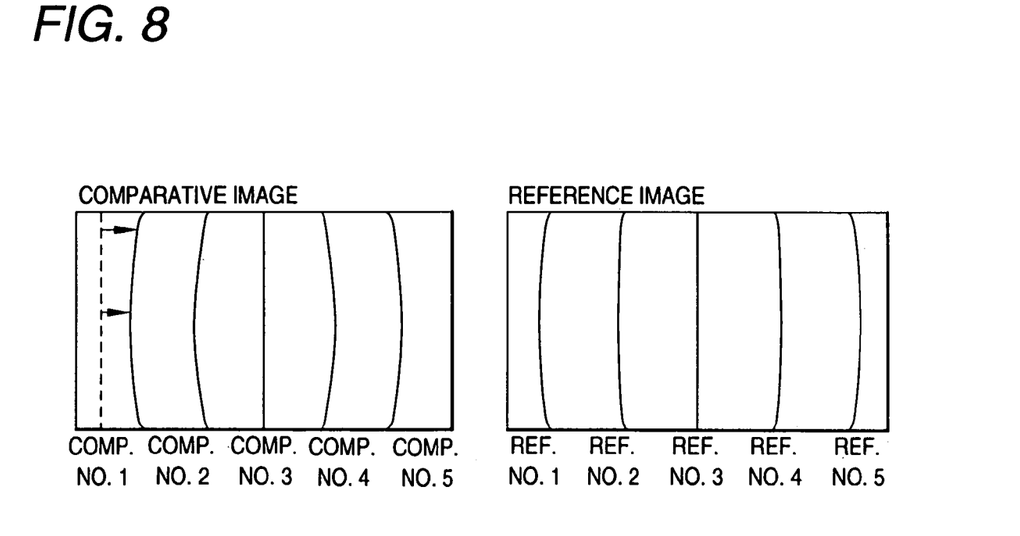
FIG. 8 is a diagram showing photographed images obtained in a case where a focal distance of the left camera is smaller than a focal distance of the right camera and a lens of the left camera is greatly distorted.

FIG. 8 is a diagram showing photographed images obtained in a case where the focal distance of the left camera 2b is smaller than the focal distance of the right camera 2a and the lens of the left camera 2b is greatly distorted. Since the aforementioned factors often exist in combination in actuality, there are many cases where the photographed images shown in FIG. 8 are obtained. Unlike the case of FIG. 7, the deviation of the corresponding vertical lines "comparison No. 1" to "comparison No. 5" varies depending not only on horizontal location but also on vertical location in the present case. Namely, the deviation of the infinite distance corresponding points χ varies depending on the vertical location in the image areas.

Figure 9:
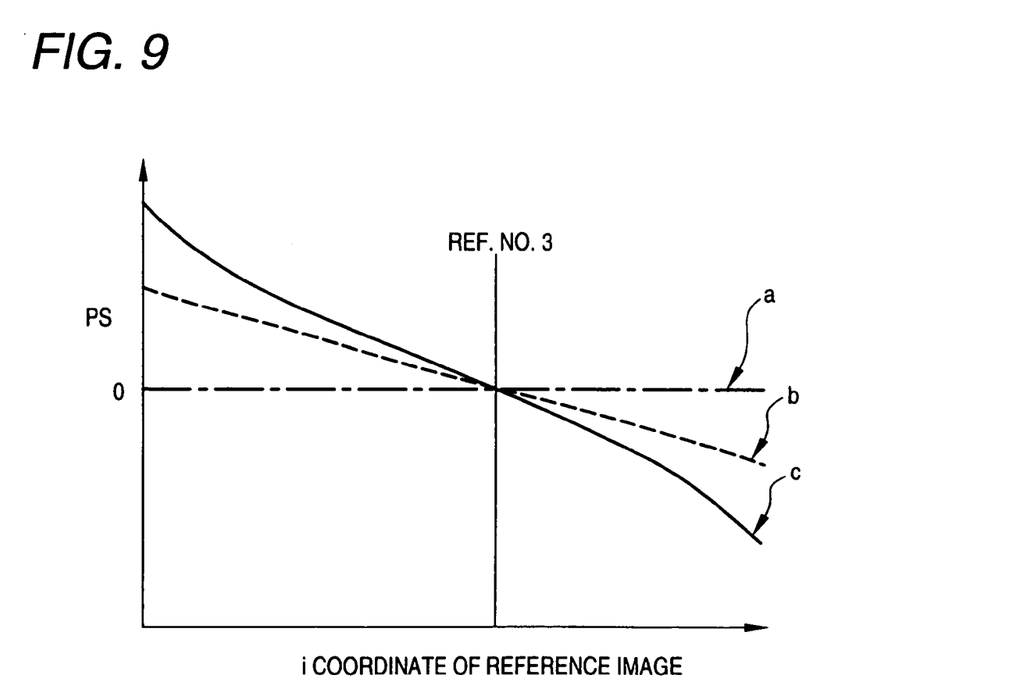
FIG. 9 is a diagram showing a relationship between reference coordinate points and correction values

The deviation of the infinite distance corresponding point χ for each location in the image areas is determined and the correction value PS corresponding to the deviation is individually set for each location as seen above. FIG. 9 is a diagram showing a relationship between reference coordinate points (coordinate points of reference pixel blocks) and correction values PS. When the infinite distance corresponding points χ coincide with their corresponding reference coordinate points X over the whole of horizontal coordinates on the images as illustrated in FIG. 6, the correction value PS is set to 0 as shown by a symbol "a" in FIG. 9. In contrast, when the vertical lines "reference No. 1," "reference No. 2,"

"reference No. 4" and "reference No. 5" are shifted toward the central vertical line "reference No. 3" as illustrated in FIG. 7, the correction value PS is set in such a way that it linearly decreases with an increase in horizontal coordinate value as shown by a symbol "b" in FIG. 9. Also, under conditions depicted in FIG. 8, correction values PS are set in such a way that it nonlinearly decrease with an increase in horizontal coordinate value as shown by a symbol "c" in FIG. 9. A curve "c" of FIG. 9 shows the correction values PS for the same vertical coordinate. Furthermore, when there exists a deviation in a yaw direction between the right and left cameras 2a, 2b, characteristics shown in FIG. 9 shift in a vertical direction.

It is possible to determine the deviation of the infinite distance corresponding points χ with respect to the reference coordinate points by measuring the deviation of corresponding vertical lines "comparison No. 1" to "comparison No. 5" to vertical lines "reference No. 1" to "reference No. 5" as seen above. As thus far described, the correlated destination of a given reference pixel block PB always exists to the right of the corresponding vertical line "comparison No. 1" which corresponds to the infinite distance corresponding point χ. Therefore, the correction value PS should be set to a search point SAD which always includes this infinite distance corresponding point χ.

It is possible to set an appropriate search range for each reference pixel block by correcting the location of the search range according to the deviation of an infinite distance corresponding point with respect to a reference coordinate point of the reference pixel block as seen above in this invention. Therefore, it is not necessary to set a large margin for the search range considering a maximum deviation of the infinite distance corresponding point as described above. Since an expansion of the search range can be avoided as a consequence, it is possible to avoid an increase in computational complexity required for stereo matching. Furthermore, since the possibility of mismatching can be reduced by avoiding the expansion of the search range, it is possible to prevent deterioration of the reliability of distance data.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A stereo matching apparatus comprising:
   a stereo camera system for taking pictures of a predetermined area and producing first and second images of the predetermined area;
   a memory for storing first image data within a reference pixel region in the first image and second image data on a horizontal line in the second image, the horizontal line being corresponding to a vertical position of the reference pixel region in the first image;
   a correction table for storing values based on a calibration process carried out with respect to the stereo camera system;
   an address generator for setting a search range in the second image for a stereo matching and instructing to read out from said memory a part of the second image data within the search range and the first image data within the reference pixel region, the search range being set according to a value read from the correction table; and
   a stereo matching unit for identifying a correlated destination of the reference pixel region by the stereo matching based on the part of the second image data within the search range and the first image data within the reference pixel region and calculating a parallax of the reference pixel region based on the correlated destination of the reference pixel region,
   wherein the value read from the correction table is indicative at least in part of an amount of deviation of an infinite distance corresponding point with respect to a horizontal position of the reference pixel region, said amount being individually set for each reference pixel region in the first image so as to set the search range in the second image in relation to each reference pixel region in the first image.

2. The stereo matching apparatus as recited in claim 1, wherein said address generator shifts the location of the search range in the same direction as a direction of the deviation of the infinite distance corresponding point with respect to the horizontal position of the reference pixel region.

3. The stereo matching apparatus as recited in claim 2, wherein said address generator shifts a starting point of the search range in the same direction as the direction of the deviation of the infinite distance corresponding point.

4. The stereo matching apparatus as recited in claim 2, wherein said address generator shifts an end point of the search range in the same direction as the direction of the deviation of the infinite distance corresponding point.

5. The stereo matching apparatus as recited in claim 1, wherein said address generator identifies the amount of correction of the search range in relation to the amount of deviation of the infinite distance corresponding point.

6. The stereo matching apparatus as recited in claim 2, wherein said address generator identifies the amount of correction of the search range in relation to the amount of deviation of the infinite distance corresponding point.

7. The stereo matching apparatus as recited in claim 3, wherein said address generator identifies the amount of correction of the search range in relation to the amount of deviation of the infinite distance corresponding point.

8. The stereo matching apparatus as recited in claim 4, wherein said address generator identifies the amount of correction of the search range in relation to the amount of deviation of the infinite distance corresponding point.

9. The stereo matching apparatus as recited in claim 2, further comprising:
   a correction value memory for storing a correction value for correcting the location of the search range in relation to a location of the reference pixel region in the first image;
   wherein said address generator sets the location of the search range for the reference pixel region based on the location of the reference pixel region and the correction value stored in said correction value memory for said location of the reference pixel region.

10. The stereo matching apparatus as recited in claim 3, further comprising:
    a correction value memory for storing a correction value for correcting the location of the search range in relation to a location of the reference pixel region in the first image;
    wherein said address generator sets the starting point of the search range for the reference pixel region based on the location of the reference pixel region anal the correction value stored in said correction value memory for said location of the reference pixel region.

11. The stereo matching apparatus as recited in claim 1, wherein said stereo camera system comprises a pair of stereo cameras mounted on a vehicle, the pair of stereo cameras taking pictures of scenes outside of the vehicle, and said stereo snatching unit calculates a distance to an object outside the vehicle on the basis of the parallax of the reference pixel region.

12. The stereo matching apparatus according to claim 1, wherein:
the stereo camera system takes a picture of a screen by a pair of stereo cameras and produces third and fourth images of the screen with being drawn a first vertical line and a second vertical line at an interval equal to a baseline of the stereo cameras;
the apparatus calculates a deviation of apposition of the second vertical line shown on the fourth image with respect to a position of the first vertical line shown on the third image and an infinite distance corresponding point corresponding to each position on the first vertical line shown on the third image on the basis of the deviation of the position of the second vertical line.

13. A stereo matching method comprising:
taking pictures of a predetermined area and producing first and second images of the predetermined area;
identifying a reference pixel region in the first image;
identifying a search range for the reference pixel region in the second image;
defining a search range for the reference pixel region based on a previously determined and stored value representing an amount of deviation of an infinite distance corresponding point with respect to position of the reference pixel region;
identifying a correlated destination of pixel region by searching a horizontal the reference through the search range; and
wherein said amount is individually set for each reference pixel region in the first image so as to set the search range in the second image in relation to a position of the reference pixel region in the first image.

14. The stereo matching method as recited in claim 13, wherein said step of correcting the location of the search range shifts the location of the search range in the same direction as the direction of the deviation of the infinite distance corresponding point with respect to the horizontal position of the reference pixel region.

15. The stereo matching method as recited in claim 14, wherein said step of correcting the location of the search range shifts a starting point of the search range in the same direction as the direction of the deviation of the infinite distance corresponding point with respect to the horizontal position of the reference pixel region.

16. The stereo matching method as recited in claim 14, wherein said step of correcting the location of the search range shifts an end point of the search range in the same direction as the direction of the deviation of the infinite distance corresponding point with respect to the horizontal position of the reference pixel region.

17. The stereo matching method as recited in claim 13, wherein said step of correcting the location of the search range corrects the location of the search range with a correction value corresponding to the deviation of the infinite distance corresponding point.

18. The stereo matching method as recited in claim 14, wherein said step of correcting the location of the search range corrects the location of the search range with a correction value corresponding to the deviation of the infinite distance corresponding point.

19. The stereo matching method as recited in 15, wherein said step of correcting the location of the search range corrects the location of the search range with a correction value corresponding to the deviation of the infinite distance corresponding point.

20. The stereo matching method as recited in 16, wherein said step of correcting the location of the search range corrects the location of the search range with a correction value corresponding to the deviation of the infinite distance corresponding point.

21. The stereo matching method as recited in claim 13, further comprising:
calculating a distance to an object outside a vehicle on the basis of the correlated destination of the reference pixel region,
wherein said step of taking pictures of the predetermined area takes pictures of scenes outside of the vehicle.

22. The stereo matching method as recited in claim 13, further comprising:
taking picture of a screen by a pair of stereo cameras and producing third and fourth images of the screen said screen being drawn a first vertical line and a second vertical line at an interval equal to a baseline of the stereo cameras;
identifying a deviation of a position of the second vertical line shown on the fourth image with respect to a position of the first vertical line shown on the third image; and
calculating an infinite distance corresponding point corresponding to each position on the first vertical line shown on the third image on the basis of the deviation of the position of the second vertical line,
wherein said step of correcting the location of the search range uses the infinite distance corresponding point thus calculated as the infinite distance corresponding point corresponding to the horizontal position of the reference pixel region.

23. A method of calculating an infinite distance corresponding point, the method comprising:
taking picture of a screen by a pair of stereo cameras and producing first and second images of the screen, said screen being drawn a first vertical line and a second vertical line at an interval equal to a baseline of the stereo cameras;
identifying a deviation of a position of the second vertical line shown on the second image with respect to a position of die first vertical line shown on the first image; and
calculating each infinite distance corresponding point corresponding to each position on the first vertical line shown on the first image on the basis of the deviation of the position of the second vertical line.

* * * * *